Dec. 26, 1944.  R. G. ALLEN  2,365,928
MOLD CARRYING MECHANISM
Filed Sept. 13, 1941  2 Sheets-Sheet 1

INVENTOR
R. G. ALLEN
BY Rule & Hoge
ATTORNEYS

Dec. 26, 1944.   R. G. ALLEN   2,365,928
MOLD CARRYING MECHANISM
Filed Sept. 13, 1941   2 Sheets-Sheet 2

INVENTOR
R. G. ALLEN
BY Rule & Hoge
ATTORNEYS

Patented Dec. 26, 1944

2,365,928

UNITED STATES PATENT OFFICE 2,365,928

MOLD CARRYING MECHANISM

Russell G. Allen, Alton, Ill., assignor to Owens-Illinois Glass Company, a corporation of Ohio Application September 13, 1941, Serial No. 410,729

8 Claims. (Cl. 49—41)

My invention relates to apparatus for removably mounting and supporting molds. The invention in its preferred form as herein illustrated is particularly adapted for use with the finishing molds of glass blowing machines. In such machines of the Owens suction type for blowing bottles, jars and other articles, the charges of glass are gathered by suction from a pool of molten glass into parison molds, each comprising a neck mold and a body blank mold. When the glass is cooled to a certain extent the blank mold is opened, leaving the parison suspended from the neck mold. The partible finishing mold is then closed around the parison and the latter blown to finished form therein. The finishing molds are removably mounted on supporting arms, permitting other molds to be substituted, and are arranged in an annular series on a continuously rotating mold carriage. An object of the present invention is to provide a novel form of mechanism for removably mounting the finishing molds in such manner that they may be removed from the machine easily and quickly and replaced by other molds without stopping the machine.

Other objects of the invention will appear hereinafter.

Referring to the accompanying drawings.

The present invention is in the nature of an improvement on the mechanism disclosed in the patent to McLaughlin, 1,662,861, March 20, 1928, Glass forming apparatus, which patent shows apparatus in many respects similar to the disclosure in the present application. Reference may be had to said patent for a fuller statement as to the construction and operation of the machine to which the present invention is applied and also for a full disclosure of those structural details of the mold carrying mechanism which in themselves are not a part of the present invention.

Figure 1:
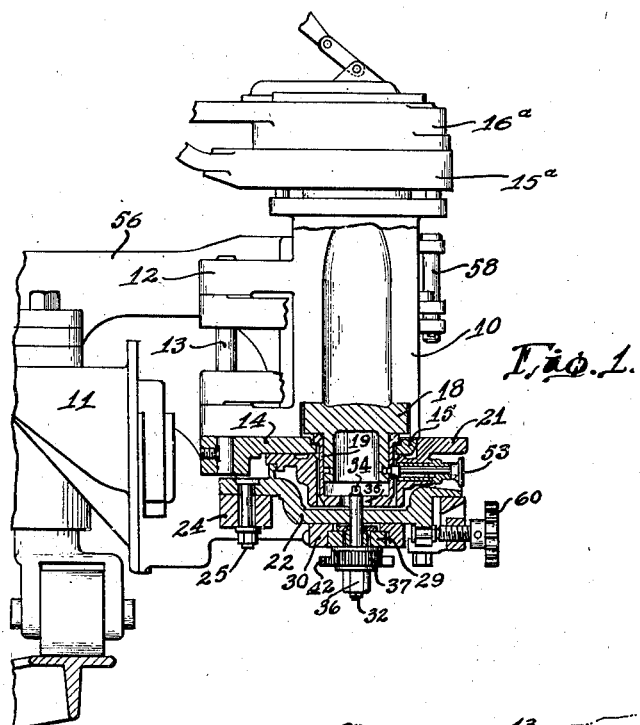
Fig. 1 is a part-sectional elevation of one unit of an Owens type bottle blowing machine showing the finishing mold and associated parts.

Referring now to Fig. 1 of the accompanying drawings, each finishing mold 10 is carried on a supporting arm 11. The mold comprises partible sections having arms 12 by which the mold sections are removably mounted to swing about the axis of a hinge pin 13 which is secured in a plate 14. This plate is herein referred to as the hinge pin plate. The mold is adapted to close about a parison suspended from a neck mold 15ª beneath and in register with a blowing head 16ª through which air under pressure is supplied for expanding the parison within the finishing mold.

The hinge pin plate 14 comprises an annular portion 15 with an integral shank 16, on the outer end of which the hinge pin 13 is mounted and secured in place by a clamping screw 17. A mold bottom plate 18 is supported in a cylindrical supporting member 19, herein referred to as the mold bottom support, the plate 18 being formed with a cylindrical extension 18ª having a sliding fit within the support 19. The support 19 extends downward through the annular portion 15 of the hinge pin plate 14 and is formed at its upper end with a rim 20 which seats in a recess within the plate 14. The latter is removably supported on a plate 21 which is recessed to receive it so that the upper surface of the shank 16 is flush with the surface of the plate 21. The mold sections normally rest on the plate 21 which is herein referred to as the mold supporting plate and on which the mold sections are slidably supported during their opening and closing movements. The plate 21 is in turn mounted on and supported by a plate holder 22. This plate holder and parts carried thereby are mounted on a mold carrier shoe 24 secured to and forming part of the swinging arm 11 by which the mold 10 is lifted and lowered to and from the neck mold 15ª. The plate holder 22 is clamped to the shoe by means of clamping bolts 25. The supporting arm 11 may be of tubular construction for the passage of cooling air which is conducted to the mold bottom through the channels 26 (Fig. 3) in the shoe 24 communicating with aligned channels 27 and 28 formed respectively in the plate holder 22 and plate 21.

Figure 3:
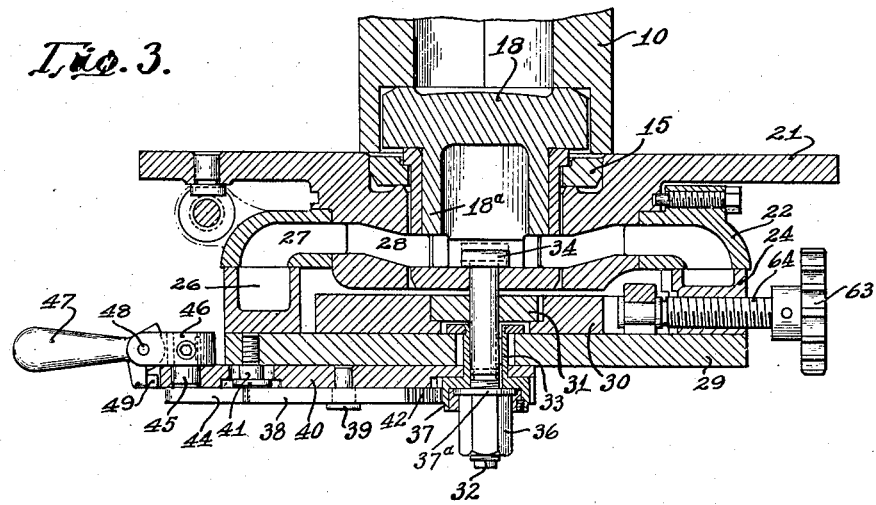
Fig. 3 is a longitudinal sectional elevation at the line 3—3 on Fig. 2, and also showing the mold and mold bottom plate.
Figure 4:
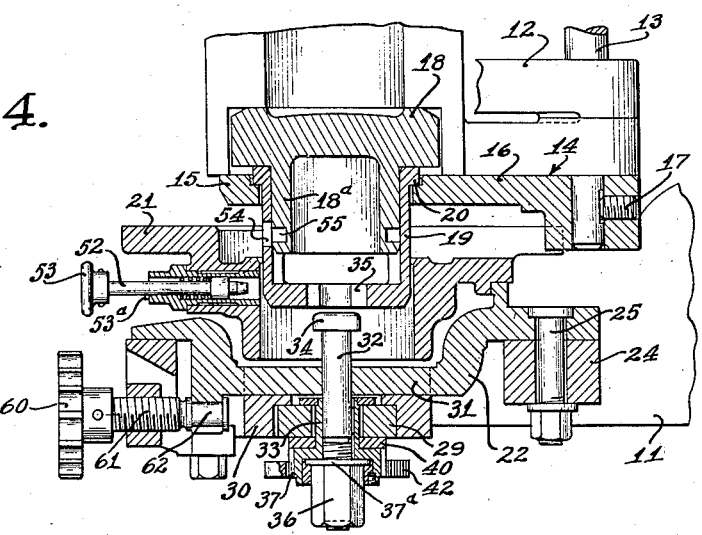
Fig. 4 is a sectional elevation viewed in a direction at right angles to that of Fig. 3, and showing the mold and hinge pin plate lifted a certain distance.
Figure 5:
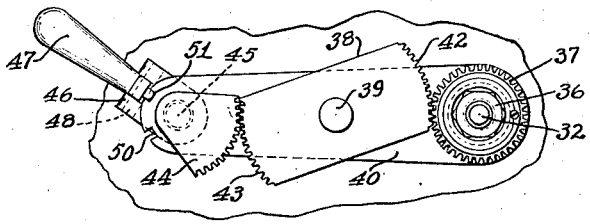
Fig. 5 is a bottom plan view showing means for actuating the clamping bolt.

Secured to the under surface of the shoe 24 is a guide bar 29 on which is mounted a slide bar 30 which is channel shaped to receive the bar 29 as shown on Fig. 4. The slide bar 30 is also formed at its upper surface with a rectangular recess to receive a cross-bar 31 forming an integral part of the plate holder 22. A clamping bolt 32 in axial alignment with the mold is splined within a bearing sleeve 33 which is clamped in the guide bar 29, permitting up and down movement of the clamping bolt. The bolt is provided with an elongated head 34 which is adapted to pass through an elongated opening 35 in the bottom of the support 19. The lower end portion of the bolt is screw-threaded to receive a clamping nut 36, said nut being formed with a flange or collar 37a by which the nut is held against up and down movement while free to rotate. Rotation of the nut serves to move the clamping bolt up and down to and from a clamping position, as indicated in Fig. 3.

Figure 2:
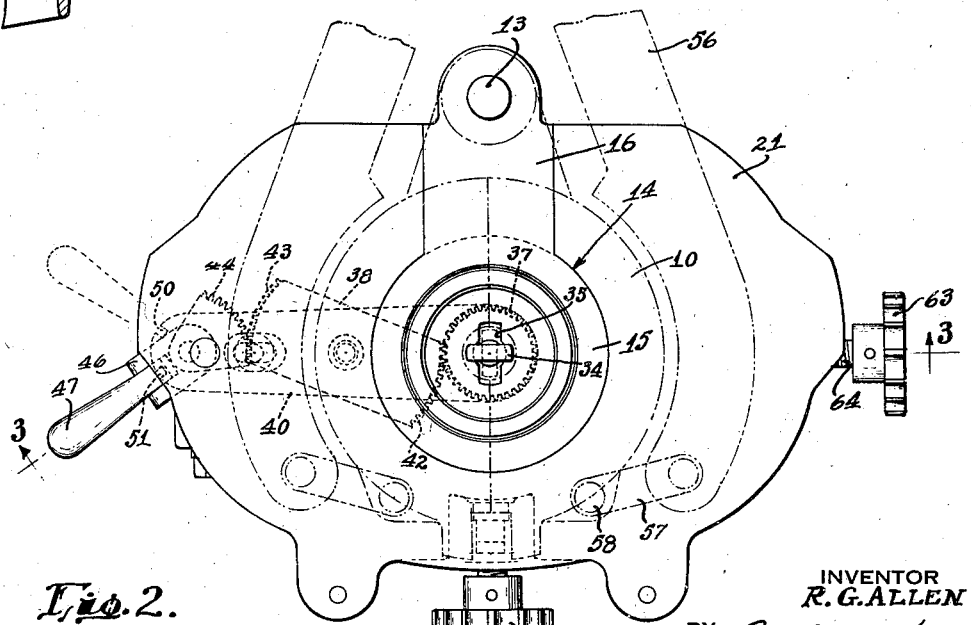
Fig. 2 is a plan view of the mold supporting mechanism.

Means will now be described for rotating the clamping bolt through an angle of 90° for moving the bolt head 34 from the full line position (Fig. 2) in which it extends across the slot 35, to a position of alignment with said slot, permitting the mold, bottom plate 18 and its support 19 to be lifted. Such means includes a spur gear 37 which, as shown, is formed integrally with the bearing sleeve 33. A rack bar 38 is mounted by means of a pivot pin 39 on the under side of a plate 40 secured by means of a clamping screw 41 to the under surface of the guide bar 29. The inner end portion of the plate 40 is of reduced thickness and is held between the gear 37 and bar 29. The rack bar 38 is provided at one end with a segmental rack 42 which meshes with the gear 37, and at its opposite end with a rack 43 which is in mesh with rack teeth formed on a segment 44 fixed to a pivot pin 45 journalled in the plate 40. A short arm 46 is secured to the pivot pin 45 and carries a handle 47 mounted to swing about a horizontal pivot 48. The handle carries a latch 49 adapted to engage notches 50 and 51 in the plate 40. When the handle is lifted to release the latch from the notch 51 and swung horizontally, it operates through the segment 44 and lever 38 to rotate the gear 37 and with it the locking pin through an angle of 90° to align the head 34 with the elongated opening 35.

The mold bottom 18, mold bottom support 19 and hinge pin plate 14 are held in a lowered position independently of the clamping bolt 32 by a latch 52 or catch pin provided with a knob 53. The catch pin extends through an opening 54 in the mold bottom support 19 and engages an annular groove 55 formed in the extension 18a of the mold bottom plate. The latch 52 thus serves as a holding means for holding the mold bottom plate 18 and its support 19 in their lowered positions, and also operates through said support 19 and mold bottom plate as a means for holding the hinge pin plate in position on the mold supporting pate 21. The catch pin 52 is held in its inward position by a coil spring and in its retracted position by a nib 53a brought into holding position by rotating the retracted catch pin. The mold sections are swung about their hinge pin 13 in a conventional manner for opening and closing the mold, by means of arms 56 (Figs. 1 and 2) connected to the mold sections by links 57 and pivot pins 58.

The operation of removing a mold is as follows: Assuming the parts to be operatively connected, with the clamping bolt 32 in clamping position as shown in Fig. 3, the operator first rotates the nut 36 so as to move the clamping bolt upwardly a short distance as shown in broken lines, permitting it to be rotated. The handle 47 is then lifted to reease the latch and swung horizontally to rotate the clamping bolt 32 through an angle of 90° as before described. The latch pin 52 (Fig. 4) is then withdrawn lengthwise and rotated so as to be held in retracted position. This releases the support 19 so that the operator may lift the hinge pin plate 14 and with it the mold 10, bottom plate 18 and support 19. In this manner the mold may be readily and quickly removed from the machine and if desired replaced by another mold. This can be done while the machine is in operation.

Adjusting means are provided for aligning the mold with the neck mold in a manner similar to that disclosed in the McLaughlin patent above referred to. Such adjusting means includes a hand knob 60 on an adjusting screw 61 having a screw-threaded connection with the shoe 24 and a swivel connection 62 with the plate holder 22. By loosening the clamping nut 36 and the nuts on the clamping bolts 25, the hand knob 60 may be rotated for adjusting the plate holder, and with it the mold, toward and from the axis of the machine. Adjustment in a direction tangential to the mold carriage is in like manner effected by means of a hand knob 63 on a shaft 64 screw-threaded in the shoe 24 and having a swivel connection with the slide bar 30.

Modifications may be resorted to within the spirit and scope of the appended claims.

I claim:

1. The combination of a sectional mold, a hinge pin plate, a hinge pin carried by and projecting upwardly from said plate, the mold sections being hinged to swing about said pin to opening and closing positions, a mold supporting plate on which said hinge pin plate is mounted, said mold supporting plate having a mold supporting surface on which the mold sections are directly supported during their said swinging movement, a latch mounted in said mold supporting plate, and means providing a locking connection between the latch and said hinge pin plate by which the latter is releasably locked to the said mold supporting plate, said mold and hinge pin plate being free to be lifted away from the mold supporting plate when the latch is released.

2. The combination of a sectional mold, a hinge pin plate, a hinge pin carried by said plate, the mold sections being hinged to swing about said pin to mold opening and closing positions, a mold supporting plate on which said hinge pin plate is mounted and on which the mold sections are directly supported, a mold bottom plate, a latch mounted on said mold supporting plate and operable to releasably hold the mold bottom plate, and means cooperating with the latch when the mold bottom plate is held by the latch, to hold the hinge pin plate in position on the mold supporting plate.

3. The combination of a sectional mold, a hinge pin plate, a hinge pin carried by said plate, the mold sections being hinged to swing about said pin to mold opening and closing positions, a mold bottom plate, a mold bottom support on which the mold bottom plate is seated, a mold supporting plate on which the mold sections are directly supported and on which the hinge pin plate is carried, and a holding device mounted in the mold supporting plate and releasably engaging the mold bottom plate and holding it seated on said mold bottom support, said mold bottom support having a portion engaging said hinge pin plate and holding the latter on said mold supporting plate.

4. The combination of a sectional mold, a horizontally disposed hinge pin plate, a hinge pin mounted in said plate and projecting upwardly therefrom, the mold sections being mounted to swing about said pin for opening and closing the mold, a mold supporting plate recessed to receive the hinge pin plate and hold it in such position that the mold sections are in sliding contact with and directly supported on said supporting plate during their opening and closing movements, and the hinge pin plate directly supported on the mold supporting plate, a manually operable holding device mounted in said mold supporting plate, and means interposed between said holding device and hinge pin plate for holding the latter in said position on the mold supporting plate, said holding device being operable to release the hinge pin plate and permit it, together with the mold, to be lifted away from the mold supporting plate.

5. The combination of a sectional mold, a horiontally disposed hinge pin plate, a hinge pin mounted in said plate and projecting upwardly therefrom, the mold sections being mounted to swing about said pin for opening and closing the mold, a mold supporting plate recessed to receive the hinge pin plate and hold it in such position that the mold sections are in sliding contact with and directly supported on said supporting plate during their opening and closing movements, and the hinge pin plate directly supported on the mold supporting plate, a mold bottom plate, a mold bottom support on which the mold bottom plate is removably seated, and a catch pin mounted in said mold supporting plate and movable manually into and out of position to hold the mold bottom support, the latter having a holding surface positioned and arranged to hold the hinge pin plate in operative position while the mold bottom support is held by said catch pin, whereby when the catch pin is operated to release the mold bottom support it permits removal of the mold bottom plate, hinge pin plate and mold bottom support as a unit from the mold supporting plate.

6. The combination of a sectional mold, a hinge pin plate, a hinge pin mounted in said plate, the mold sections being mounted to swing about said pin for opening and closing the mold, a mold supporting plate having a recess in which the hinge pin plate is seated in position for the said mold supporting plate to provide a support on which the mold sections are slidably supported during the opening and closing movements, a plate holder on which said mold supporting plate is carried, and means for removably clamping the mold supporting plate to said plate holder.

7. The combination of a sectional mold, a hinge pin plate, a hinge pin mounted in said plate, the mold sections being mounted to swing about said hinge pin for opening and closing the mold, a mold bottom plate, a mold bottom support on which the mold bottom plate is removably seated, a carrier on which said parts are supported, a clamping bolt rotatively mounted and supported by said carrier and having a head positioned to engage the mold bottom support and clamp said mold bottom support and hinge pin plate in operative position on said carrier when the bolt is in a predetermined rotative position, said clamping bolt head being moved into position to disengage the clamping bolt from said mold bottom support and permit the hinge pin plate, mold bottom plate and mold bottom support to be lifted as a unit when the bolt is rotated to a predetermined releasing position, and manual means supported on the carrier and operatively connected to the bolt for rotating the bolt between said predetermined positions.

8. The combination of a sectional mold, a hinge pin plate, a hinge pin mounted in said plate, the mold sections being mounted to swing about said hinge pin for opening and closing the mold, a mold supporting plate forming a support for the mold and said hinge pin plate, a clamping bolt, a support in which the clamping bolt is rotatably mounted, means providing a connection between the clamping bolt and said hinge pin plate by which the latter is clamped to said mold supporting plate when the bolt is in a predetermined rotative position and released when the bolt is rotated to a predetermined releasing position, a plate holder forming a support for the mold supporting plate, and mechanism mounted on said plate holder and operatively connected to the clamping bolt for rotating the clamping bolt from said clamping position to said releasing position and thereby releasing said plate and mold, permitting them to be lifted from said support.

RUSSELL G. ALLEN.